E. H. DANFORTH.
MODE FOR MAKING CORUNDUM WHEELS.
No. 48,160. Patented June 13, 1865.
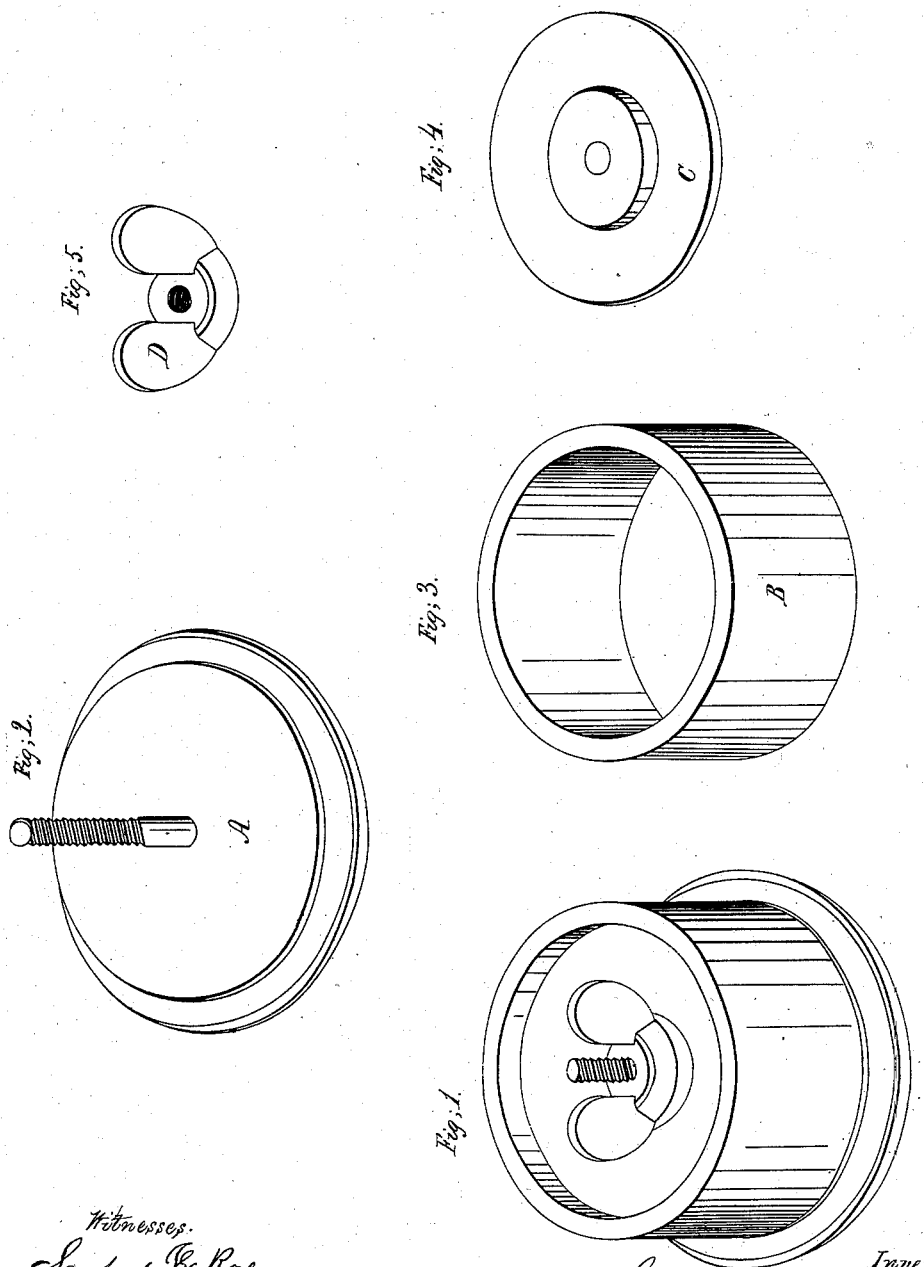

UNITED STATES PATENT OFFICE.

ELIJAH H. DANFORTH, OF JAMESTOWN, NEW YORK.

IMPROVED MOLD FOR MAKING CORUNDUM-WHEELS.

Specification forming part of Letters Patent No. 48,160, dated June 13, 1865.

*To all whom it may concern:*

Be it known that I, ELIJAH H. DANFORTH, of Jamestown, in the county of Chautauqua and State of New York, have invented a new and useful machine for renewing corundum-wheels used by dentists for grinding teeth when the surface has become imperfect, which I term a "Corundum-Press;" and I do hereby declare that the following is a full, clear, and exact description of the construction and operation of the same, reference being had to the annexed drawings, making a part of this specification, in which—

Figure 1 is a perspective view. Fig. 2 is a bed with a screw-post in the center. Fig. 3 is curb; Fig. 4, a follower; Fig. 5, a nut.

Fig. A, the bed, is round, four inches in diameter and one-half of an inch thick, with the upper surface turned perfectly level and thoroughly polished, in the center of which stands a screw-post two and one-half inches high and one-fourth of an inch thick.

Fig. B, the curb, is round, three inches in diameter, one and one-half of an inch in height, and one-fourth of an inch thick. The inner surface is turned and thoroughly polished. The edges are also turned, so as to make a perfect joint when set on the bed.

Fig. C, the follower, is of sufficient diameter to fill the curb perfectly, one-fourth of an inch thick, or thicker, at the edge, so as to insure its passage evenly through the curb. It may also be thickened in the center, so that it may be steadied by the screw-post, which passes through the center of it. Its lower surface is turned level and thoroughly polished. In its center is a hole one-fourth of an inch in diameter, corresponding perfectly with the diameter of the screw-post, drilled at right angles with the polished surface Fig. D, the nut, is one and one-half an inch in diameter and one-half an inch thick, with a branch rising from each side, so as to be conveniently operated with the thumb and finger. It contains a female screw, running through it at right angles with the lower turned surface, corresponding perfectly with the thread of the screw-post.

The capacity of the press to receive or make large and small wheels may be produced by making it large or small as a whole, or by making a plurality of curbs and followers of different sizes.

The press is made of cast-iron, except the screw-post, which is made of steel.

Mode of using it: If you wish to make a new wheel, mix gum-shellac and corundum in a common glue-pot. Oil the polished surfaces of the press, rubbing off the surplus oil. Then place the curb on the bed. Put into it a sufficient quantity of the mixture to make a wheel of the desired thickness. Adjust the follower in its place. Put on the nut and run it down before the compound has time to cool; but if it should get so cold as to prevent its being pressed into a perfect wheel, place the press in an oven or on a stove, where it will heat gradually, till you will require a thin cloth holder to handle it. Then screw it down firmly and cast the press into cold water a few moments, when it will be ready to take apart. If you wish to renew an old wheel, inclose it in the press, heat, screw down, and cool, as above. If you wish to make a new wheel of old ones or of broken ones, put them in equally around the screw-post. Then proceed as described above. Before using the wheels wash them in strong soap-suds.

What I claim as my invention, and desire to secure by Letters Patent, is—

Not the base A or the curb B, or any other part herein described, but their combination, as set forth and described, and represented in Fig. 1, a perspective view.

ELIJAH H. DANFORTH.

Witnesses:
 ED. R. BOOTEY,
 JOHN J. KINNEY.